W. R. McKEEN, Jr.
CAR BODY CONSTRUCTION.
APPLICATION FILED JAN. 17, 1907.
973,366.
Patented Oct. 18, 1910
2 SHEETS—SHEET 1.
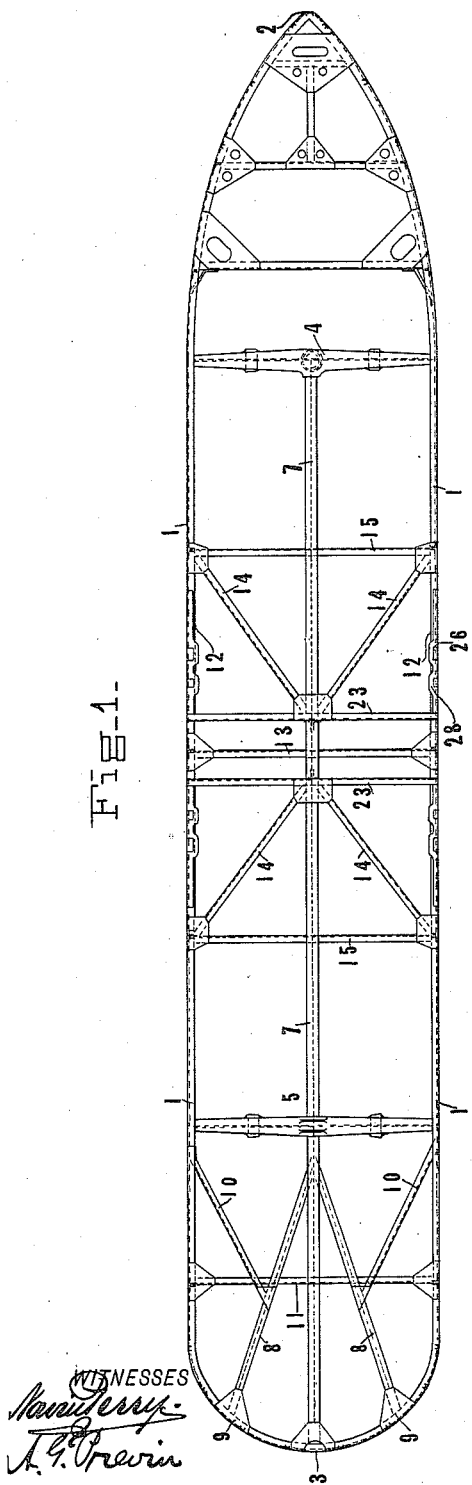
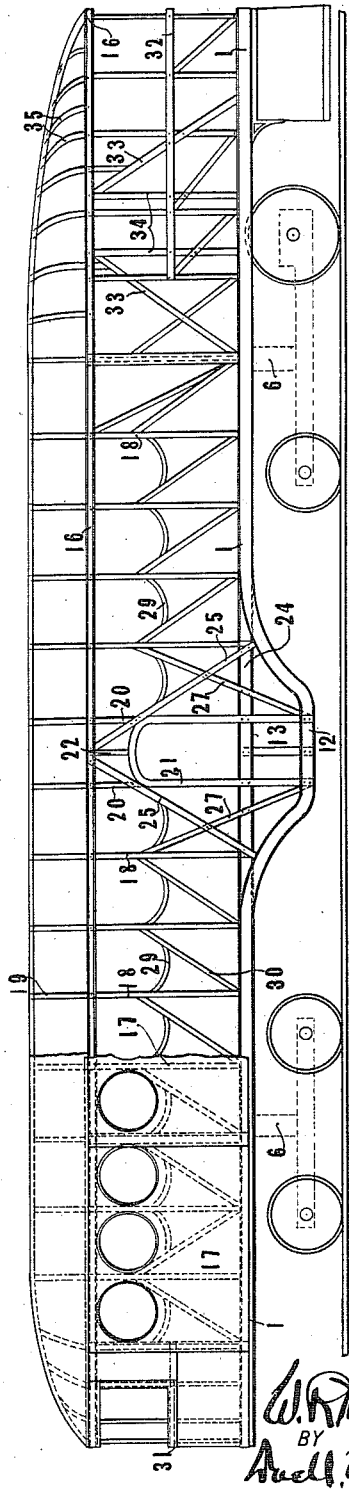

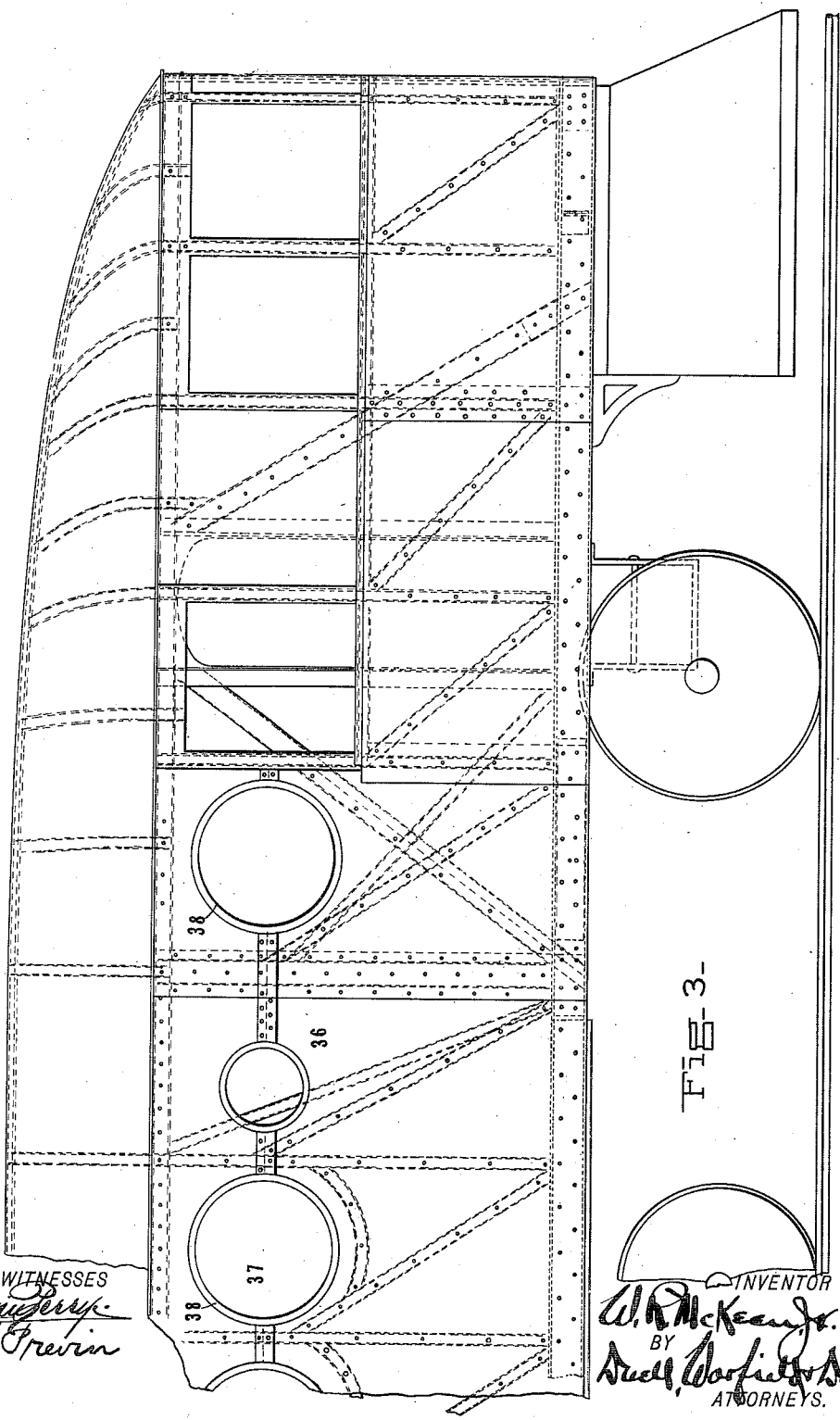

UNITED STATES PATENT OFFICE.

WILLIAM R. McKEEN, JR., OF OMAHA, NEBRASKA, ASSIGNOR, BY MESNE ASSIGNMENTS, TO McKEEN MOTOR CAR COMPANY, OF OMAHA, NEBRASKA, A CORPORATION OF NEW JERSEY.

CAR-BODY CONSTRUCTION.

973,366.    Specification of Letters Patent.    Patented Oct. 18, 1910.

Application filed January 17, 1907. Serial No. 352,724.

*To all whom it may concern:*

Be it known that I, WILLIAM R. McKEEN, Jr., residing at Omaha, in the county of Douglas and State of Nebraska, have invented certain new and useful Improvements in Car-Body Construction, of which the following is a full, clear, and exact description, such as will enable others skilled in the art to which it appertains to make and use the same.

This invention relates to the construction of car bodies and structures of like nature.

One of the objects thereof is to provide a car body of simple and inexpensive and yet stiff and durable construction.

Another object is to provide a structure of the above type in which the door is at a convenient height from the ground and is so disposed with respect to the remainder thereof as to be adapted for most efficient use.

Another object is to provide a car body of the type first mentioned in which the windows are of such character as to be well suited to perform the functions required thereof, and so formed and related to the frame elements as not to interfere with the best arrangement thereof or detract materially from the strength or stiffness of the structure.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings, in which is shown one of various possible embodiments of my invention, Figure 1 is a plan of the floor frame thereof. Fig. 2 is a side elevation of the car frame. Fig. 3 is a side elevation of the forward portion of the car.

Similar reference characters refer to similar parts throughout the several views of the drawings.

As tending to render more readily understood certain aims and features of this invention, it may here be noted that in the construction of car bodies in general use the windows and doors are a source of weakness, not only by reason of the cutting away of the material but on account of interference with the disposition of the frame members. Aside from their weakening effect upon the structure of the car, the entrances in common use present many defects, among which may be mentioned the inconvenience of access thereto and the employment of exposed and often slippery steps, which are a constant source of annoyance and even of personal danger to the users. Car windows of the ordinary type are also in themselves defective, not only by reason of their weakening effect but on account of the difficulty of sealing the same in closed position and the consequent leaking of air and dust to the interior of the car. The above and other defects are eliminated and many positive advantages attained in constructions of the nature of that hereinafter described.

Referring now to Fig. 1 of the accompanying drawings, there are shown side sills 1 which converge substantially to a point 2 at the forward end of the car and are connected to the rounded end sill 3 at the rear. This end sill as well as the forward converging portions are preferably formed integral with the side sills and thus afford in effect a continuous band of metal upon which the upper portion of the frame is mounted.

Car bolsters 4 and 5 are stretched between the side sills 1 and preferably rest within the inturned flanges of the channel shaped material from which the sills are formed. These bolsters are mounted upon the trucks 6 and are secured to a heavy center sill 7 which passes entirely through the bolster 5 and terminates at the end sill 3, being held in place as by a suitable gusset.

Springing from center sill 7 are outwardly inclined braces 8, which are secured to the end sill as by gussets 9, and tend to transmit any thrust exerted upon the center sill to the side sills and thus to diffuse the same throughout the frame of the car. This action is expedited by means of inclined braces 10 which are secured to the braces 8 and extend to and are secured to the side sills 1. The rear portion of the floor frame is further stiffened by the transverse member or needle beam 11 which is stretched between the side sills and passes beneath the center sill 7 and the above-mentioned inclined braces.

Each of side sills 1 is preferably provided with a depressed portion 12, that is, a portion which extends beneath the general level of the floor frame of the car. Braces 13 extend from center sill 7 to each of the depressed portions 12, and a pair of horizontal braces 14 extend from each side sill toward and are connected with the center sill 7, as shown in the drawings. Adjacent the points of junction of these braces with the side sills, there are stretched between the latter members the transverse braces or needle beams 15 which are disposed beneath the center sill 7 and are preferably secured thereto.

About the upper portion of the car body there is mounted a substantially continuous member 16 which is preferably parallel to the main portion of the side sills 1 and the side portions of which are hereinafter referred to as "side plates." It may here be noted, however, that by the term "side plate" is meant any longitudinal member of the upper portion of the side frame of a car, and that the term is not limited to the form or precise disposition of the element herein shown. Side plates 17 are mounted upon the sills by the uprights or studs 18 which may, if desired, be arched entirely over the car and thus form roof supporting ribs 19.

From the depressed portions of the side sills are extended uprights 20 similar to the uprights 18 above mentioned, and having mounted therebetween a door frame 21 secured to the side plate 17, as by the member 22. Uprights 20 are connected across the car in pairs by the beams 23, and braces 24 extend to each of these uprights from the adjacent portions of the corresponding side sills. From each side sill 1 braces 25 are inclined toward and connected with the corresponding side plate 17, at points above the corresponding depressed portion 12, and rest within suitable pockets 26 in the braces 24. Likewise extending from depressed portions 12 are oppositely-inclined braces 27 which rest in pockets 28 in the braces 24 and terminate upon uprights 18.

Mounted between the uprights 18 are curved braces 29 which are preferably secured at one end to the corresponding upright and rest at the remaining end upon the adjacent inclined brace 30. The several braces 30 are in general oppositely inclined at the respective ends of the car toward the center thereof, in such manner as to be best adapted to transmit any shock upon the floor framing from either end of the car to the upper frame thereof.

The extreme rear and forward portions of the car frame are provided with longitudinal members 31 and 32 respectively, which tend to stiffen these portions of the frame, and at the forward end there are provided a pair of heavy braces 33 springing from the upper portion of a pair of uprights 34 in such manner as to permit the opening between the latter members to be used, if desired, as a door.

It may here be noted that the heavy braces 33 not only prevent any sagging of the end of the car, but also hold the forward point or nose of the same against either upward or downward movement in the event of the same striking some obstacle upon the track. These braces, moreover, aid materially in transmitting the stresses from the heavy side sills to the upper portion of the car frame and thence downwardly through the side frame to the body bolster. At the forward and rear portions of the roof frame, moreover, additional roof ribs 35 are provided.

About the entire side and end framing of the car are stretched sheets 36, as best indicated in Figs. 2 and 3 of the drawings, which are riveted to the frame members and form therewith, especially by virtue of the relatively heavy character of the sill 1 and side plate 17, plate girders which extend beyond the points of support of the car, namely, the car bolsters 4 and 5. In this manner a frame is provided which is not only so stiff as to resist any tendency to deformation due to jars or even the excessive impact occurring in a railway wreck, but to withstand the stresses which often result in a gradual sagging at the center or ends of the car. Within these sheets 36 are formed openings 37 adapted to receive window frames 38, as shown in Fig. 3 of the drawings. These openings are preferably of circular form, but it is to be understood that the term "circular" is used in a broad sense and not as limited to a conformation defining a mathematical circle. By the use of window openings of this character, not only are the windows better adapted to perform their ordinary functions, as is set forth in my copending application hereinafter referred to, but, with a given extent of opening, the weakening of the car frame is reduced to a minimum and the disposition of the frame elements in such manner as best to perform their functions is substantially uninterfered with.

It may here be noted that the term "center sill" as used throughout this description and in the following claims is intended to comprehend any longitudinal element disposed between the side sills of the floor frame, whether of the single construction shown or comprising a number of substantially parallel parts.

The method of action of the above-described structure is substantially as follows: Assuming any impact to be exerted upon the heavy sill, the same is evenly transmitted throughout the whole of the sill by reason of the bracing of the floor framing and the bridging of the depressed portions in both vertical and horizontal directions. From the sill the shock is transmitted to the uprights 18, not only directly at their lower ends, but through the inclined bracing, thence from these parts to the continuous upper plate, and thence throughout the remainder of the car. These several frame elements, moreover, not only form a rigid skeleton upon which the sheets may be mounted, but are conversely held by the sheets in proper position to perform their functions, and any sudden or gradual dislocation thereof prevented. All ordinary stresses, moreover, are readily met by the car body on account of the plate girder conformation of these side frames, as above set forth.

It will thus be seen that I have provided a car body in which the objects of my invention are fully attained, and that the raw material for the same comprises in general merely stock parts, and is so readily assembled as to reduce the total cost of the structure to a minimum. It will also be seen that the resultant body is of the most rigid character, and is adapted not only to withstand the hardest use but is free from all tendency to sag either at the center or ends, the latter largely by reason of the fact that the side frames form in fact plate girders substantially unweakened by windows and doors, and extending from end to end of the car.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. It is also to be understood that the language used in the following claims is intended to cover all of the generic and specific features of the invention herein described and all statements of the scope of the invention, which, as a matter of language, might be said to fall therebetween.

Several features herein shown and described are shown, described and claimed in one or more of my co-pending applications, Serial No. 380,220, filed June 22, 1907 and Serial No. 277,912, filed September 11, 1905, and accordingly are not claimed herein.

Having described my invention, what I claim as new and desire to secure by Letters Patent is:—

1. In car construction, in combination, a pair of side sills, a center sill, means connecting said side sills at the end of the car, and a pair of members secured to said last-mentioned means intermediate said side sills and inclined inwardly therefrom toward and abutting against and secured to said center sill.

2. In car construction, in combination, a pair of side sills, a center sill, means connecting said side sills at the end of the car, a pair of members secured to said last-mentioned means intermediate said side sills and inclined inwardly therefrom toward and abutting against opposite sides of said center sill, and a pair of members respectively secured to said last-mentioned members and inclined outwardly therefrom toward and secured to said side sills.

3. In car construction, in combination, a pair of side sills, a center sill, an end sill curved about the end of the car and joined to said side sills, and a pair of members secured to said end sill at points intermediate said center and side sills and inclined inwardly therefrom toward and connected to said center sill.

4. In car construction, in combination, a pair of side sills, a center sill, an end sill curved about the end of the car and joined to said side sills, a pair of members secured to said end sill and inclined inwardly therefrom toward and connected to said center sill, and a pair of members respectively secured to said last-mentioned members and inclined outwardly therefrom toward and secured to said side sills.

5. In car construction, in combination, a pair of side sills, a center sill, means connecting said side sills at the end of the car, a pair of members secured to said last-mentioned means and inclined inwardly therefrom toward and secured to said center sill, and a cross member stretched between and secured to said side sills and passing beneath said center sill.

6. In car construction, in combination, a pair of side sills, a center sill, an end sill curved about the end of the car and joined to said side sills, a pair of members secured to said end sill and inclined inwardly therefrom toward and connected to said center sill, a pair of members respectively secured to said last-mentioned members and inclined outwardly therefrom toward and secured to said side sills, and a cross member stretched between and secured to said side sills and passing beneath said center sill.

7. In car construction, in combination, a side sill having a depressed portion, a center sill, and a brace extending from said center sill to said depressed portion of said side sill and secured to both of the same.

8. In car construction, in combination, a center sill, a side sill having a depressed portion, a pair of uprights secured to said depressed portion of said side sill, a pair of members extending from said center sill and respectively connected with said uprights, and a pair of members extending from said side sill and respectively connected with said uprights.

9. In car construction, in combination, a center sill, a side sill having a depressed portion, a pair of uprights secured to said depressed portion of said side sill, a pair of members extending from said center sill and respectively connected with said uprights, a pair of members extending from said side sill and respectively connected with said uprights, and a brace extending from said center sill to said depressed portion of said side sill.

10. In car construction, in combination, a pair of side sills having depressed portions substantially opposite one another, a center sill, braces extending from said center sill to said depressed portions of said side sills, a pair of uprights mounted upon each of said depressed portions of said side sills, cross members secured to said center sill and connecting said uprights transversely in pairs, and a member extending from each of said uprights to the adjacent portion of the corresponding side sill.

11. In car construction, in combination, a center sill, a side sill provided with a depressed portion, and a pair of braces secured to said center sill and inclined outwardly toward and secured to the upper portions of said side sill.

12. In car construction, in combination, a center sill, a pair of side sills provided with depressed portions substantially opposite one another, and a pair of members secured to the upper portions of each of said side sills and inclined toward and secured to said center sill.

13. In car construction, in combination, a center sill, a pair of side sills provided with depressed portions substantially opposite one another, a pair of members secured to the upper portions of each of said side sills and inclined toward and secured to said center sill, and a pair of members stretched between said side sills adjacent the points of junction therewith of said inclined members.

14. In car construction, in combination, a center sill, a side sill provided with a depressed portion, a pair of braces secured to said center sill and inclined outwardly toward and secured to the upper portions of said side sill, and a brace extending from said center sill to said depressed portion of said side sill.

15. In car construction, in combination, a center sill, a side sill having a depressed portion, a pair of uprights secured to said depressed portion of said side sill, a pair of members extending from said center sill and respectively connected with said uprights, a pair of members extending from said side sill and respectively connected with said uprights, and a pair of braces secured to the upper portions of said side sill and inclined toward and connected with said center sill.

16. In car construction, in combination, a center sill, a side sill having a depressed portion, a pair of uprights secured to said depressed portion of said side sill, a pair of members extending from said center sill and respectively connected with said uprights, a pair of members extending from said side sill and respectively connected with said uprights, a brace extending from said center sill to said depressed portion of said side sill, and inclined braces from said center sill to said side sill.

17. In car construction, in combination, a pair of side sills having depressed portions substantially opposite one another, a center sill, braces extending from said center sill to said depressed portions of said side sills, a pair of uprights mounted upon each of said depressed portions of said side sills, cross members secured to said center sill and connecting said uprights transversely in pairs, a member extending from each of said uprights to the adjacent portion of the corresponding side sill, and a pair of inclined braces secured to the upper portions of each of said side sills at each side of the depressed portions thereof and inclined toward and secured to said center sill.

18. In car construction, in combination, a pair of side sills having depressed portions substantially opposite one another, a center sill, braces extending from said center sill to said depressed portions of said side sills, a pair of uprights mounted upon each of said depressed portions of said side sills, cross members secured to said center sill and connecting said uprights transversely in pairs, a member extending from each of said uprights to the adjacent portion of the corresponding side sill, a pair of inclined braces secured to the upper portions of each of said side sills at each side of the depressed portions thereof and inclined toward and secured to said center sill, and a pair of members stretched between said side sills at points adjacent the junction therewith of said last-mentioned braces.

19. In car construction, in combination, a center sill, a side sill provided with a depressed portion, a pair of braces secured to said center sill and inclined outwardly toward and secured to the upper portions of said side sill, means connecting said side sills at the end of the car, and a pair of members secured to said last-mentioned means and inclined inwardly therefrom toward and connected with said center sill.

20. In car construction, in combination, a center sill, a side sill provided with a depressed portion, a pair of braces secured to said center sill and inclined outwardly toward and secured to the upper portions of said side sill, means connecting said side sills at the end of the car, a pair of members secured to said last-mentioned means and inclined inwardly therefrom toward and connected with said center sill, and a pair of cross members stretched between said side sills at points adjacent the junction therewith of said braces.

21. In car construction, in combination, a center sill, a pair of side sills provided with depressed portions substantially opposite one another, a pair of members secured to the upper portions of each of said side sills and inclined toward and secured to said center sill, a pair of members stretched between said side sills adjacent the points of junction therewith of said inclined members, means connecting said side sills at the end of the car, a pair of members secured to said last-mentioned means and inclined inwardly therefrom toward and connected with said center sill, and a pair of braces secured to said last-mentioned inclined members and inclined outwardly therefrom toward and respectively connected with each of said side sills.

22. In car construction, in combination, a side sill, a side plate, a plurality of uprights stretched between said side sill and said side plate, a plurality of inclined braces secured between said uprights, and a plurality of curved braces respectively mounted between said inclined braces and said uprights.

23. In car construction, in combination, a side sill, a side plate, a plurality of integral metallic uprights stretched between said side sill and said side plate, a plurality of integral metallic braces respectively connected with said side sill adjacent the foot of each of said uprights and inclined toward and each riveted directly to another of said uprights at a point intermediate said side sill and said side plate said braces being inclined away from the adjacent end of the car and a plurality of braces respectively extending from said inclined braces to the adjacent uprights.

24. In car construction, in combination, a side sill, a side plate, a plurality of uprights stretched between said side sill and said side plate, a plurality of braces respectively connected with said side sill adjacent the foot of each of said uprights and inclined toward and each connected with another of said uprights at a point intermediate said side sill and said side plate, and a plurality of curved braces respectively mounted between said inclined braces and said uprights.

25. In car construction, in combination, a side sill, a side plate, a plurality of uprights stretched between said side sill and said side plate, a plurality of braces respectively connected with said side sill adjacent the foot of each of said uprights and inclined toward and each connected with another of said uprights at a point intermediate said side sill and said side plate, and a plurality of curved braces respectively mounted between said inclined braces and said uprights, said first braces being inclined away from the nearer end of the car.

26. In car construction, in combination, a side sill provided with a depressed portion, a side plate, and a pair of inclined braces secured to said side sill and to said side plate at a point above said depressed portion.

27. In car construction, in combination, a side sill provided with a depressed portion, a side plate, a pair of inclined braces secured to said side sill and to said side plate at a point above said depressed portion, and a pair of uprights secured to said depressed portion of said side sill and extending to and secured to said braces and said side plate, said inclined braces being secured to said sill at points above the lower ends of uprights.

28. In car construction, in combination, a side sill provided with a depressed portion, a side plate, a pair of inclined braces secured to said side sill and to said side plate at a point above said depressed portion, a pair of uprights secured to said depressed portion of said side sill and connected with said braces and said side plate, a second pair of uprights extending from said side sill at points above the lower ends of said first uprights to said side plate, and a pair of braces secured to said depressed portion of said side sill and respectively inclined toward and connected with the members of said second pair of uprights.

29. In car construction, in combination, a side sill provided with a depressed portion, a side plate, a pair of inclined braces secured to said side sill and to said side plate at a point above said depressed portion, a plurality of uprights extending from said side sill to said side plate, a plurality of braces each of which is secured to said side sill adjacent the foot of one of said uprights and is inclined toward and secured to another of said uprights, and means forming a door frame between said depressed portion and said side plate.

30. In car construction, in combination, a side sill provided with a depressed portion, a side plate, a pair of inclined braces secured to said side sill and to said side plate at a point above said depressed portion, a plurality of uprights extending from said side sill to said side plate, and a plurality of braces each of which is secured to said side sill adjacent the foot of one of said uprights and is inclined toward and secured to another of said uprights, said braces being upwardly inclined toward the center of the car.

31. In car construction, in combination, a side sill provided with a depressed portion, a side plate, a pair of inclined braces secured to said side sill and to said side plate at a point above said depressed portion, a plurality of uprights extending from said side sill to said side plate, a plurality of braces each of which is secured to said side sill adjacent the foot of one of said uprights and is inclined toward and secured to another of said uprights, a plurality of braces mounted between and connected with said uprights, and means forming a door frame between said depressed portion and said side plate.

32. In car construction, in combination, a side sill, a side plate, a plurality of uprights stretched between said sill and said plate, a plurality of inclined braces, each of which is secured to said sill and to one of said uprights at a point intermediate said sill and said side plate, and sheets stretched between said sill and said side plate and forming a substantially flat car wall, said sheets being provided with substantially circular openings between said uprights and over said inclined braces adapted to receive window frames, whereby said inclined braces may be secured in position at a point above the lower edge of said window openings.

33. In car construction, in combination, a side sill, a side plate, a plurality of uprights stretched between said sill and said plate, a plurality of inclined braces respectively extending upwardly from said sill, and sheathing extending between said sill and said side plate and having window openings formed therein of a downwardly narrowing conformation between said uprights and extending downwardly between said uprights and the adjacent braces, whereby said inclined braces may be secured in position at a point above the lower edge of said window openings.

34. In car construction, in combination, a side sill, a side plate, a plurality of uprights stretched between said sill and said plate, a plurality of inclined braces, each of which is secured to said sill and to one of said uprights at a point intermediate said sill and said side plate, sheets stretched between said sill and said side plate, said sheets being provided with substantially circular openings between said uprights and above said inclined braces adapted to receive window frames, and curved members beneath said openings mounted between and connected with said uprights.

35. In car construction, in combination, a side sill having a depressed portion, a center sill, a brace extending from said center sill to said depressed portion of said side sill, a side plate, a pair of inclined braces connected with said side sill and extending toward and connected with said side plate at a point above said depressed portion and a door framed upon said sill between said inclined braces.

36. In car construction, in combination, a center sill, a side sill having a depressed portion, a pair of uprights secured to said depressed portion of said side sill, a pair of members extending from said center sill and respectively connected with said uprights, a pair of members extending from said side sill and respectively connected with said uprights, a side plate, and a pair of inclined braces connected with said side sill and extending toward and connected with said side plate at a point above said depressed portion.

37. In car construction, in combination, a center sill, a side sill having a depressed portion, a pair of uprights secured to said depressed portion of said side sill, a pair of members extending from said center sill and respectively connected with said uprights, a pair of members extending from said side sill and respectively connected with said uprights, a brace extending from said center sill to said depressed portion of said side sill, a side plate, and a pair of inclined braces connected with said side sill and extending toward and connected with said side plate at a point above said depressed portion.

38. In car construction, in combination, a side sill provided with a depressed portion, a side plate, a plurality of uprights stretched between said sill and said plate, a plurality of inclined braces, each of which is secured to said sill and to one of said uprights at a point intermediate said sill and said side plate, sheets stretched between said sill and said side plate, said sheets being provided with substantially circular openings between said uprights and above said inclined braces adapted to receive window frames, bracing members beneath said openings mounted between and connected with said uprights and means forming a door upon said depressed portion of said sill.

39. In car construction, in combination, a center sill, a side sill having a depressed portion, a pair of uprights secured to said depressed portion of said side sill, a pair of members extending from said center sill and respectively connected with said uprights, a pair of members extending from said side sill and respectively connected with said uprights, a brace extending from said center sill to said depressed portion of said side sill, a side plate, a pair of inclined braces connected with said side sill and extending toward and connected with said side plate at a point above said depressed portion, a pair of uprights stretched between said sill and said side plate, and a pair of braces extending from said depressed portion of said sill and respectively inclined toward and connected with said uprights.

40. In car construction, in combination, a side sill, a side plate, a plurality of uprights stretched between said sill and said plate, a plurality of inclined braces, each of which is secured to said sill and to one of said uprights at a point intermediate said sill and said side plate, and sheathing extending from said sill to said side plate, said sheathing having formed therein window openings the lower portion of which is of less width than the central portion and shaped to extend between said inclined braces and the adjacent uprights whereby said inclined braces may be secured in position at a point above the lower edge of said window openings, and the upper portion of which extends above the upper ends of said inclined braces.

41. In car construction, in combination, a side sill having a depressed portion, a center sill, and a brace extending from said center sill at a point longitudinally offset from the undepressed portions of said side sill to the depressed portion of said side sill.

42. In car construction, in combination, a pair of side sills having substantially opposite depressed portions, a center sill, and braces extending from said center sill at a point longitudinally offset from the undepressed portions of said side sills to the depressed portions of said side sills.

43. In car construction, in combination, a side sill having a depressed portion, a center sill, and braces extending from said center sill to said depressed portion of said side sill, uprights extending from said side sill to embrace a space for a door over said depressed portion, and braces extending from said center sill to said uprights.

44. In car construction, in combination, a pair of side sills provided with substantially opposite depressed portions, a center sill, braces extending from said center sill to said depressed portions of said side sill, a pair of uprights extending from each of said side sills to embrace spaces for doors over said depressed portions thereof, and braces extending from said center sill to each of said uprights.

45. In car construction, in combination, a pair of side sills having substantially opposite depressed portions, a pair of uprights extending from each of said side sills to embrace spaces for doors over the depressed portions thereof, and a pair of members extending across the car and connecting said uprights in pairs.

46. In car construction, in combination, a side sill having an integral depressed portion, a center sill, a brace from said center sill to said depressed portion of said side sill, a pair of uprights extending from said side sill to embrace a space for a door over said depressed portion, and braces extending from said center sill to said uprights.

47. In car construction, in combination, a side sill having a depressed portion, a center sill, an upper side plate, a brace extending from said center sill to said depressed portion of said side sill, a pair of uprights extending from said side sill to embrace a space for a door over said depressed portion of said side sill, and a pair of braces secured to said side sill upon opposite sides of said uprights and inclined upwardly toward one another and secured to said side plate.

48. In car construction, in combination, a side sill having an integral depressed portion, an upper side plate, a pair of uprights extending from said side sill to said side plate to embrace a space for a door over said depressed portion, and a pair of braces secured to said side sill upon opposite sides of said uprights and upwardly inclined toward one another and secured to said side plate.

In testimony whereof I affix my signature, in the presence of two witnesses.

WILLIAM R. McKEEN, Jr.

Witnesses:
H. VAN ARSDALE,
C. W. LOUCKS.